(12) United States Patent
Han et al.

(10) Patent No.: US 12,456,328 B2
(45) Date of Patent: Oct. 28, 2025

(54) IMAGE PROCESSING DEVICE AND FACE DETECTION METHOD

(71) Applicant: SK hynix Inc., Icheon-si (KR)

(72) Inventors: Ji Hee Han, Icheon-si (KR); Jong Heon Kim, Icheon-si (KR); Hun Kim, Icheon-si (KR); Jae Hyun Im, Icheon-si (KR); Ju Hyun Cho, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 228 days.

(21) Appl. No.: 18/332,579

(22) Filed: Jun. 9, 2023

(65) Prior Publication Data

US 2024/0185634 A1 Jun. 6, 2024

(30) Foreign Application Priority Data

Dec. 5, 2022 (KR) .................. 10-2022-0167854

(51) Int. Cl.
| | |
|---|---|
| *G06V 40/16* | (2022.01) |
| *G06T 5/70* | (2024.01) |
| *G06T 7/11* | (2017.01) |
| *G06T 7/136* | (2017.01) |
| *G06T 7/194* | (2017.01) |

(Continued)

(52) U.S. Cl.
CPC .............. *G06V 40/162* (2022.01); *G06T 5/70* (2024.01); *G06T 7/11* (2017.01); *G06T 7/136* (2017.01); *G06T 7/194* (2017.01); *G06T 7/50* (2017.01); *G06T 7/70* (2017.01); *G06V 10/25* (2022.01); *G06T 2207/20021* (2013.01); *G06T 2207/30201* (2013.01)

(58) Field of Classification Search
CPC .... G06V 40/162; G06V 10/25; G06V 40/161; G06V 10/26; G06V 40/172; G06V 10/751; G06T 5/70; G06T 7/11; G06T 7/136; G06T 7/194; G06T 7/50; G06T 7/70; G06T 2207/20021; G06T 2207/30201; G06T 7/73; G06T 2207/10028
See application file for complete search history.

(56) References Cited

U.S. PATENT DOCUMENTS

| | | | |
|---|---|---|---|
| 9,547,907 B2 * | 1/2017 | Somanath | ............... G06T 7/194 |
| 9,811,916 B1 * | 11/2017 | Khokhlov | ............... G06T 7/246 |
| 11,704,776 B2 * | 7/2023 | Zhou | ........................ G06T 5/70 |
| | | | 348/47 |

FOREIGN PATENT DOCUMENTS

| | | | |
|---|---|---|---|
| KR | 100519782 B1 | 10/2005 | |
| KR | 100922429 B1 | 10/2009 | |
| KR | 101958116 B1 | 3/2019 | |

* cited by examiner

*Primary Examiner* — Phuoc Tran
(74) *Attorney, Agent, or Firm* — WILLIAM PARK & ASSOCIATES LTD.

(57) ABSTRACT

An image processing device is provided, which has an improved face detection method. The image processing device may include a background manager, which determines a foreground region having a target object and a background region which excludes the target object based on image data that includes pixel values of pixels included in the image and depth map data that includes disparity values of the image pixels; and a target object manager determines a reference position of the target object by counting foreground pixels included in the foreground region in a preset direction at a plurality of positions, and detecting the target object corresponding to a preset shape within a region of interest that is set based on the reference position.

21 Claims, 6 Drawing Sheets

(51) Int. Cl.
*G06T 7/50* (2017.01)
*G06T 7/70* (2017.01)
*G06V 10/25* (2022.01)

IMAGE PROCESSING DEVICE AND FACE DETECTION METHOD

CROSS-REFERENCE TO RELATED APPLICATION

The present application claims priority under 35 U.S.C. § 119(a) to Korean patent application number 10-2022-0167854 filed on Dec. 5, 2022, in the Korean Intellectual Property Office, the entire disclosure of which is incorporated by reference herein.

BACKGROUND

1. Technical Field

Various embodiments of the present disclosure generally relate to an image processing device, and more particularly to an image processing device and a face detection method.

2. Related Art

Generally, image sensors may be classified into a charge coupled device (CCD) image sensor and a complementary metal oxide semiconductor (CMOS) image sensor. Recently, the CMOS image sensor, which has low manufacturing cost, has low power consumption, and facilitates integration with a peripheral circuit, has attracted attention.

An image sensor included in a smartphone, a tablet PC, or a digital camera may acquire image information of an external object by converting light reflected from the external object into an electrical signal. An image processing device may detect a specific object included in an image from image information.

Research into an algorithm for detecting a face, among objects included in an image, has been actively conducted. An algorithm for detecting a face in a specific situation rather than an algorithm for detecting a face in all situations may perform an efficient face detection operation at low cost.

SUMMARY

Various embodiments of the present disclosure are directed to an image processing apparatus and a face detection method, which extract a foreground region included in an image based on disparity values, determine the position of a neck based on the number of pixels corresponding to a specific position, and detect a face in a region of interest that is set depending on the position of the neck.

An embodiment of the present disclosure may provide for an image processing device. The image processing device may include a background manager configured to determine a foreground region including a target object and determine a background region of the image that is without the target object in an image based on image data, the image data including pixel values of pixels included the image, and depth map data, the depth map data comprising disparity values of the pixels, and a target object manager configured to determine a reference position of the target object based on count values obtained by counting foreground pixels included in the foreground region in a preset direction at a plurality of positions, and to detect the target object corresponding to a preset shape within a region of interest that is set based on the reference position.

An embodiment of the present disclosure may provide for a face detection method using an image processing device. The face detection method may include determining a disparity threshold at which an interclass variance between a first region including a face and a second region including no face in an image is maximized based on disparity values of pixels included in the image, removing the second region from the image based on the disparity threshold, determining a neck position corresponding to the face based on count values obtained by counting first pixels included in the first region in a preset direction at a plurality of positions, and detecting the face corresponding to a preset shape within a region of interest that is set based on the neck position.

An embodiment of the present disclosure may provide for a face detection method using an image processing device. The face detection method may include determining a disparity threshold at which an interclass variance between a first region including a face and a second region including no face is maximized in an image including pixels, based on a probability distribution corresponding to disparity values of the pixels, segmenting the image into the first region and the second region based on the disparity threshold, setting a plurality of positions within a region including a larger portion of the first region among equal regions, obtained by dividing the image into the equal regions in a preset direction, counting numbers of first pixels included in the first region in the preset direction at the plurality of positions, determining a position at which a smallest number of first pixels are counted, among the plurality of positions, to be a neck position corresponding to the face, and detecting the face corresponding to a preset shape in a region of interest that is set based on the neck position.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure will now be described more fully hereinafter with reference to the accompanying drawings, in which preferred embodiments of the present disclosure are shown, so that those skilled in the art can easily practice the technical spirit of the present disclosure.

Figure 1:
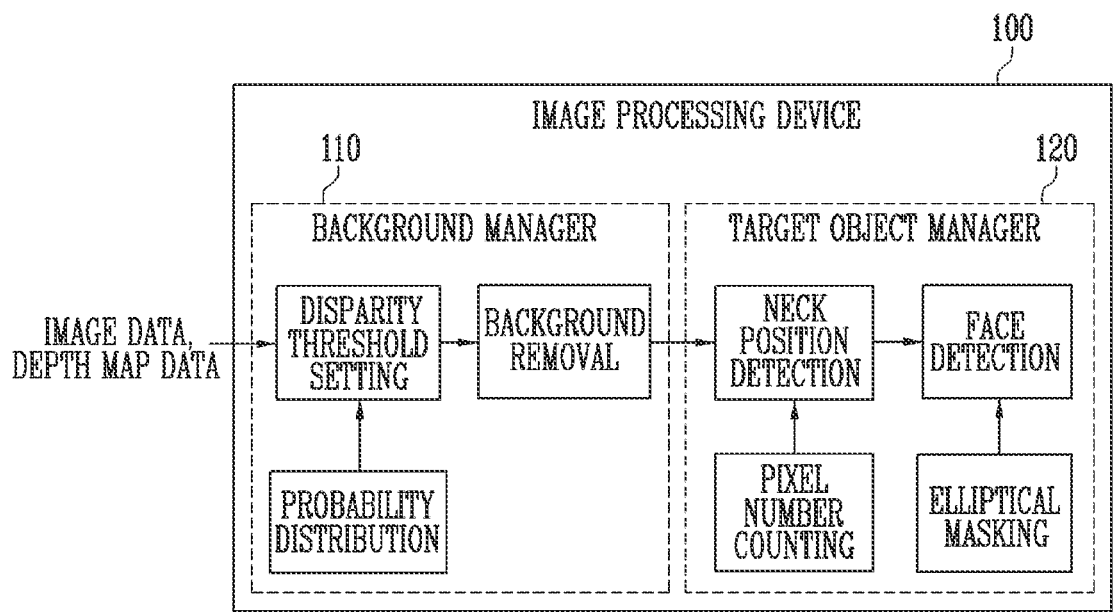
FIG. 1 is a diagram illustrating an image processing device according to an embodiment of the present disclosure.

FIG. 1 is a diagram illustrating an image processing device according to an embodiment of the present disclosure.

Referring to FIG. 1, an image processing device 100 may detect a target object included in an image. For example, the target object may be a face, a hand, a foot, or motion. In an embodiment of the present disclosure, the image processing device 100 may detect a face included in the image based on image data and depth map data. The image processing device 100 may determine a region of interest, having a high probability that the target object will be detected, and perform a target object detection operation only on the region of interest, rather than performing a target object detection operation on the entire image. Because a detection operation is performed only on a part of the image, the cost required for detection of the target object may be reduced.

The image processing device 100 may receive the image data and the depth map data from an external device, such as an image sensor, or from an internal memory. The image data may include the pixel values of pixels included in the image. The image data may be data on which an interpolation operation is performed, for example, RGB image data or CMYK image data, rather than raw data. The image data may include color information and brightness information of the pixels included in the image. The depth map data may include the disparity values of the pixels included in the image.

The image sensor may generate depth map data including disparity values using a plurality of cameras or depth sensors and transfer the depth map data to the image processing device 100. The image processing device 100 may receive raw data and perform an image processing operation based on the received raw data before performing a target object detection operation. For example, the image processing device 100 may generate RGB image data or CMYK image data by performing an interpolation operation, or may generate depth map data including disparity values based on phase information included in the raw data. The image processing device 100 may store the generated RGB image data, CMYK image data, and depth map data in the internal memory. Because the image processing operation performed based on the raw data may correspond to the disclosed technology, it may be omitted in description of the disclosed technology in the present specification.

The image processing device 100, may comprise a programmable processor or, functionally-equivalent combinational and sequential logic devices. The image processing device 100 may also comprise program instructions, i.e., software, which cause a processor component of the image processing device 100 to perform or effectuate operations, including but not limited to those depicted in FIGS. 6-9, described below.

The image processing device 100 may include a background manager 110 and a target object manager 120. The image processing device 100 may output an image in which only a foreground region is included and a background region is removed from the entire image, or may output an image in which only a target object in the entire image is included.

The background manager 110, like the image processing device 100, may be embodied as a processor or combinational and sequential logic devices, which may determine a foreground region including the target object and a background region including no target object in the image, based on the image data and the depth map data. In other embodiments, the background manager 110 may be embodied as program instructions to determine a foreground region including the target object and a background region including no target object in the image, based on the image data and the depth map data. Hereinafter, regardless of how the background manager is implemented or embodied the background manager 110 may adaptively set a criterion based on which the foreground region and the background region are differentiated from each other depending on the image to be processed. When the image to be processed is changed, the differentiation criterion may also be changed.

In an embodiment of the present disclosure, the background manager 110 may differentiate between the foreground region and the background region based on the disparity values of the pixels. The background manager 110 may determine a disparity threshold based on a probability distribution corresponding to the disparity values. The background manager 110 may determine the disparity threshold so that the interclass variance of the disparity values included in the image is maximized.

The background manager 110 may determine the foreground region including pixels having disparity values less than or equal to the disparity threshold and the background region including pixels having disparity values greater than the disparity threshold. The background manager 110 may remove the background region from the image by changing the pixel values of the pixels included in the background region into a preset pixel value.

The target object manager 120 may determine the reference position of the target object in the foreground region. In an embodiment of the present disclosure, the target object is a face, and thus the reference position may be a neck. The thinnest portion in the image may generally indicate the neck, and may be located beneath the target object. The target object manager 120 may count the number of pixels included in the foreground region in a preset direction within a lower portion of the foreground region and may determine the position of the neck based on the count value.

The target object manager 120 may set a portion, having the strongest possibility that a face that is the target object will be located based on the neck position, as a region of interest. Generally, an elliptical object on the neck has the strongest possibility of being the face. The target object manager 120 may perform an elliptical masking operation above the neck position. By the elliptical masking operation, an elliptical object may be detected. The target object manager 120 may determine the detected elliptical object to be the face that is the target object. The target object manager 120 may output an image including only the face by changing the pixel values of the remaining pixels, other than the face, in the entire image to the preset pixel value.

Figure 2:
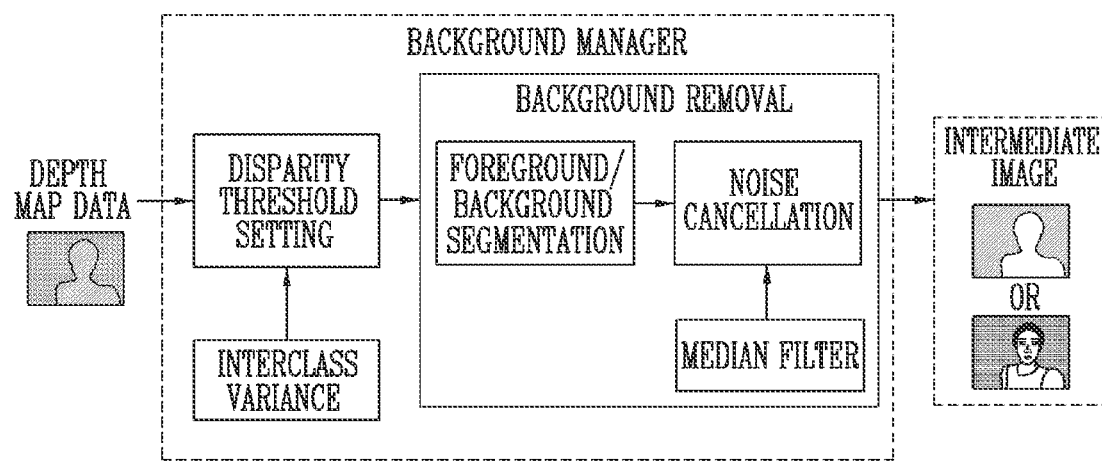
FIG. 2 is a diagram illustrating a method of removing a background region according to an embodiment of the present disclosure.

FIG. 2 is a diagram illustrating a method of removing a background region according to an embodiment of the present disclosure.

Referring to FIG. 2, the background manager may generate an intermediate image from which a background region is removed from an image based on depth map data.

The background manager may determine a disparity threshold which is a criterion for differentiating between a foreground region including a target object and a background region including no target object. The background manager may adaptively determine the disparity threshold so that separation between the foreground region and the background region is maximized.

In an embodiment of the present disclosure, the background manager may determine the disparity threshold at which an interclass variance between the foreground region and the background region is maximized based on the disparity values. The interclass variance between the foreground region and the background region may be calculated based on first probabilities that pixels included in an image will be included in the foreground region, a first disparity expectation value which is the average of the first probabilities, and the total disparity expectation value of all pixels included in the image. A detailed process is represented as follows:

The first probability $w_0$ that each of the pixels will be included in the foreground region and a second probability $w_1$ that each of the pixels will be included in the background region may be represented as follows.

$$w_0: p(C_0) = \sum_{i=Dmin}^{T} p_i = w(k)$$

$$w_1: p(C_1) = \sum_{i=T+u}^{Dmax} p_i = 1 - w(k)$$

$$p_i = \frac{n_i}{N}$$

Here, w(k) may denote the first probability, $D_{min}$ may denote the minimum value of disparity values of the pixels, $D_{max}$ may denote the maximum value of the disparity values of the pixels, u may denote a disparity increment, $n_i$ may denote the number of pixels having a disparity of i, N may denote the total number of pixels included in the image, $P_i$ may denote a probability distribution of the pixels having a disparity of i, $C_0$ may denote the pixels included in the foreground region, $C_1$ may denote pixels included in the background region, and T may denote a disparity threshold.

The average $\mu_0$ of the probabilities of the foreground region and the average $\mu_1$ of the probabilities of the background region may be represented as follows:

$$\mu_0: \sum_{i=Dmin}^{T} i \cdot p(i \mid C_0) = \sum_{i=Dmin}^{T} i \cdot \frac{p_i}{w_0} = \mu(k)/w(k)$$

$$\mu_1: \sum_{i=T+u}^{Dmax} i \cdot p(i \mid C_1) = \sum_{i=T+u}^{Dmax} i \cdot \frac{p_i}{w_1} = \frac{\mu_T - \mu(k)}{1 - w(k)}$$

$$\mu(k) = \sum_{i=Dmin}^{T} i \cdot p_i, \mu_T = \sum_{i=Dmin}^{Dmax} i \cdot p_i$$

Here, $\mu(k)$ may be a first disparity expectation value which is the average of the first probabilities $w_0$, and $\mu_T$ may be the total disparity expectation value of all pixels.

The disparity variance $\sigma_0$ of the foreground region and the disparity variance $\sigma_1$ of the background region are represented as follows:

$$\sigma_0 = \sum_{i=Dmin}^{T} (i - \mu_0)^2 \cdot p(i \mid C_0) = \sum_{i=Dmin}^{T} (i - \mu_0)^2 \cdot \frac{p_i}{w_0}$$

$$\sigma_1 = \sum_{i=T+u}^{Dmax} (i - \mu_1)^2 \cdot p(i \mid C_1) = \sum_{i=T+u}^{Dmax} (i - \mu_1)^2 \cdot \frac{p_i}{w_1}$$

According to the following equations, $$w_0 + w_1 = 1$$

$$w_0 \mu_0 + w_1 \mu_1 = \mu_T$$

$$w_0 \sigma_0^2 + w_1 \sigma_1^2 = \sigma_w^2$$

$$\sigma_T^2 = \sigma_w^2 + \sigma_b^2 = \sum_{i=1}^{L} (i - \mu_T)^2 p_i$$

an interclass variance $\sigma_b^2$ between the foreground region and the background region may be derived as follows:

$$\sigma_b^2 = w_0(\mu_0 - \mu_T)^2 + w_1(\mu_1 - \mu_T)^2$$

$$= w_0 w_1 (\mu_1 - \mu_0)^2$$

$$= \frac{(w(k) * \mu_T - \mu(k))^2}{1 - w(k)}$$

Here, $\sigma_T^2$ may be the total variance, and $\sigma_W^2$ may be intraclass variance between the foreground region and the background region.

The background manager may calculate the interclass variance $\sigma_b^2$ while increasing the maximum disparity value of the foreground pixels included in the foreground region within a range from the minimum value to the maximum value of disparity values. The background manager may set the maximum disparity value appearing when the interclass variance $\sigma_b^2$ is maximized as the disparity threshold. This may be represented by the following equation:

$$\sigma_B^2(T) = \max_{Dmin \leq T < Dmax} \sigma_b^2(T)$$

The background manager may segment the image into the foreground region and the background region depending on the set disparity threshold. The background manager may apply a median filter to the foreground region and the background region which are segmented from each other. By means of the application of the median filter, noise contained in the foreground region and the background region may be cancelled. In an embodiment of the present disclosure, noise may be cancelled based on another filter such as a Gaussian filter.

The background manager may generate an intermediate image from which the background region is removed based on the depth map data including disparity values. In the intermediate image, the pixel values of the pixels included in the background region may be changed to a preset pixel value. In an embodiment of the present disclosure, the pixel values of the pixels included in the background region may be 0.

In an embodiment of the present disclosure, the intermediate image may be configured such that the background region and the foreground region are unified to different pixel values. For example, all of pixel values in the background region of the intermediate image may be 0, and all of pixel values in the foreground region of the intermediate image may be 1. In an embodiment of the present disclosure, only the pixel values in the background region of the intermediate image may be unified. The pixel values in the foreground region of the intermediate image may be determined depending on RGB image data. The background manager may generate an intermediate image, in which only the pixel values in the background region are unified, based on the image data.

In FIG. 2, an operation in which the background manager segments the image into the foreground region and the background region and cancels noise may be an operation of removing the background from the image.

Figure 3:
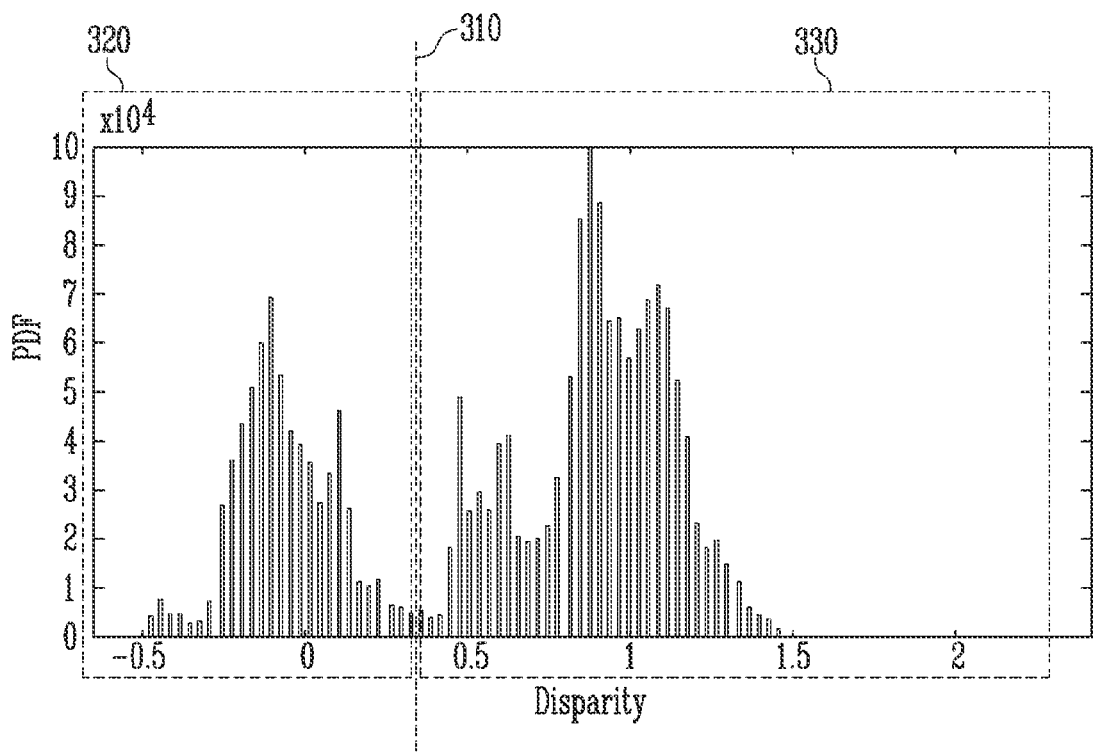
FIG. 3 is a diagram illustrating the segmentation of a foreground region and a background region according to an embodiment of the present disclosure.

FIG. 3 is a diagram illustrating the segmentation of a foreground region and a background region according to an embodiment of the present disclosure.

Referring to FIG. 3, a disparity histogram of pixels may be illustrated. A horizontal axis may indicate disparity values of pixels, and a vertical axis may indicate a probability density function corresponding to the disparity values. Pixels included in an image may be segmented into a foreground region 320 and a background region 330 based on a disparity threshold 310.

The disparity values of the pixels may include negative values and zero (0). The disparity values of pixels in an in-focus state may be 0. The disparity values of pixels having a focal length increased from that in an in-focus state may be positive values. On the other hand, the disparity values of pixels having a focal length decreased from that in an in-focus state may be negative values.

The background manager may calculate the interclass variance between the foreground region and the background region while increasing the maximum disparity value of the foreground pixels. The background manager may set the disparity threshold so that the calculated interclass variance is maximized. FIG. 3 may illustrate an example of the disparity threshold that is set based on the interclass variance. The disparity threshold may be set differently depending on the disparity values of the pixels. Therefore, the background manager may improve separation between the foreground region and the background region from the image by adaptively determining the disparity threshold.

Figure 4:
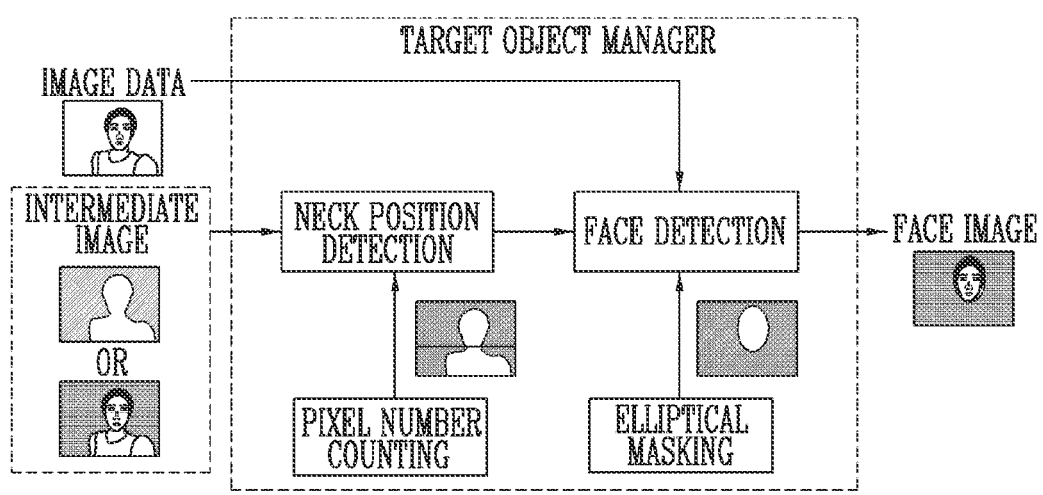
FIG. 4 is a diagram illustrating a method of detecting a face included in a foreground region according to an embodiment of the present disclosure.

FIG. 4 is a diagram illustrating a method of detecting a face included in a foreground region according to an embodiment of the present disclosure.

Referring to FIG. 4, the target object manager may detect the position of a neck that is the reference position of a target object based on an intermediate image, and may detect the position of the face that is the target object based on the neck position. The target object manager may generate a face image including only the face based on the detected face position and image data.

The target object manager may count the number of foreground pixels included in a foreground region in a preset direction at each of a plurality of positions. In an embodiment of the present disclosure, the preset direction may be a horizontal direction. The target object manager may count foreground pixels in a vertical direction depending on the rotation of the image. The target object manager may determine the preset direction in various manners depending on the detected target object. The target object manager may determine the reference position of the target object based on the count value. In an embodiment of the present disclosure, the reference position may indicate the neck position.

The target object manager may detect the target object corresponding to a preset shape in a region of interest, which is set based on the reference position. In an embodiment of the present disclosure, the target object may be a face, and the preset shape may be an elliptical shape.

The target object manager may set a temporary region based on the position of the foreground region in the image. The target object manager may set a plurality of positions included in a boundary of the temporary region.

The target object manager may divide the intermediate image into two equal regions of the same size in a direction in which foreground pixels are counted. In an embodiment of the present disclosure, the target object manager may determine a region including a larger portion of the foreground region between the two equal regions to be the temporary region. In an embodiment of the present disclosure, the target object manager may detect the central point of the foreground region and determine a region including the central point between the two equal regions to be the temporary region.

The target object manager may convert the pixel values of pixels included in the foreground region, among the pixels included in the temporary region, into 1, and may convert the pixel values of the remaining pixels into 0. The target object manager may count the number of pixels included in the foreground region by summing the pixel values in the preset direction at the plurality of positions, respectively, after the pixel values are converted.

The target object manager may determine a position at which the count value is minimized, among the plurality of positions, to be the reference position. With respect to the case where the target object is a face, the position at which the count value is minimized in the foreground region may be a neck. Generally, the neck may be located beneath the face, and may be the thinnest body part among parts of an upper body.

The target object manager may set the region of interest based on the position of the neck in the foreground region. The target object manager may set the region of interest in a direction vertical to the preset direction. Because the face that is the target object may have a strong possibility of being located on the neck, the target object manager may set a portion above the neck position in a vertical direction as the region of interest.

The size of the region of interest may be determined based on the total size of the foreground region. For example, as the size of the foreground region is larger, the size of the region of interest may also be larger. The region of interest may include a portion of the temporary region.

The target object manager may determine an elliptical object within the region of interest to be the face that is the target object. The size of the elliptical shape may be proportional to the size of the region of interest. The target object manager may detect an elliptical object by performing an elliptical masking operation in the region of interest.

The target object manager may detect the position of the face in the intermediate image, and may detect the face in the image data based on the detected face position. The target object manager may generate a face image including only the face based on the face position and image data. The target object manager may change all of pixel values of pixels not corresponding to the face, among the pixels included in the image, to a preset pixel value. The target object manager may output a face image.

Figure 5:
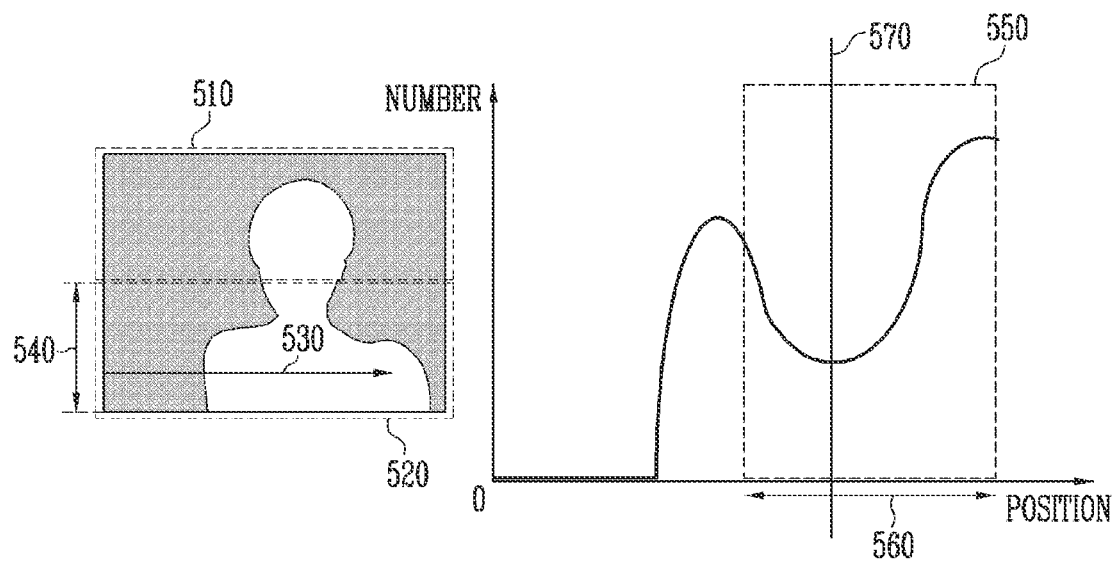
FIG. 5 is a diagram illustrating a temporary region and a reference position according to an embodiment of the present disclosure.

FIG. 5 is a diagram illustrating a temporary region and a reference position according to an embodiment of the present disclosure.

Referring to FIG. 5, a graph in which an intermediate image segmented into two regions 510 and 520 and count values obtained by counting the number of foreground pixels in a preset direction at the boundary of the intermediate image are indicated may be illustrated. In FIG. 5, the preset direction may be assumed to be a horizontal direction, and the x axis of the graph may denote positions at which counting starts and the y axis thereof may denote the number of pixels.

The intermediate image may be segmented into two regions 510 and 520 having the same area in the preset direction. The target object manager may set a temporary region, including a plurality of positions to be starting points for counting the number of pixels, between the two regions 510 and 520.

The target object manager may generate two regions 510 and 520 by segmenting the intermediate image in a horizontal direction. The target object manager may set the region 520 including a larger portion of the foreground region as the temporary region.

The target object manager may sum (530) pixel values counted in the horizontal direction from respective positions included in the boundary of the temporary region. Because the pixel values of the pixels included in the foreground region, among the pixels included in the temporary region, are 1, the result of summing the pixel values may be the number of pixels.

In an embodiment of the present disclosure, the target object manager may set the plurality of positions at the left vertical boundary 540 of the temporary region. The pixel values of pixels in a right horizontal direction from the plurality of positions, respectively, may be summed. In an embodiment of the present disclosure, when pixel values are summed in a left horizontal direction, the target object manager may set a plurality of positions at the right vertical boundary of the temporary region.

In the graph of FIG. 5, the temporary region may be a region 550, and the plurality of positions may be included in a line 560. A position 570 at which a count value is minimized within the temporary region may be determined to be the neck position. Because the position at which the count value is minimized within the entire range of the graph may not be a neck position, there may be a need to set the temporary region in the intermediate image so as to improve the accuracy of face detection.

Figure 6:
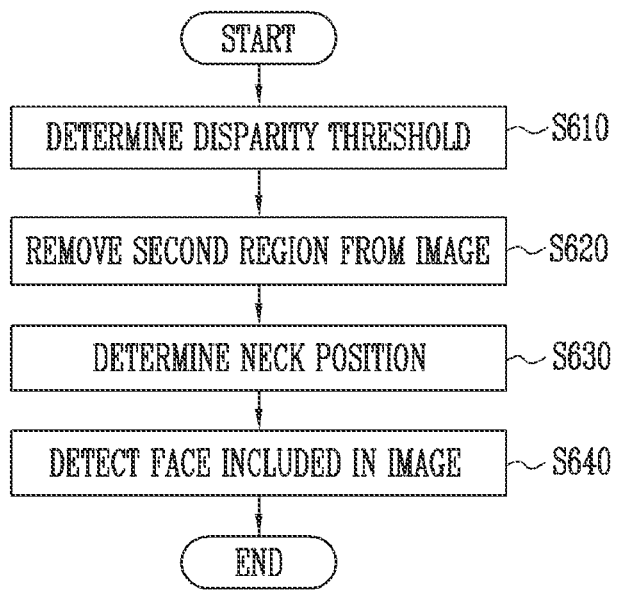
FIG. 6 is a flowchart illustrating steps of a method of detecting a face according to an embodiment of the present disclosure.

FIG. 6 is a flowchart illustrating steps of a method of detecting a face according to an embodiment of the present disclosure. The steps of the method depicted in FIG. 6, i.e., determining, S610, removing, S620, determining, S630 and detecting, S640, are accomplished (effectuated) by program instructions executed by a processor.

Referring to FIG. 6, an image processing device may detect a face that is a target object included in an image based on image data and depth map data. In an embodiment of the present disclosure, the face detected by the image processing device may be detected in an image of an upper body including the face, a neck, and shoulders. The detected face may be assumed to be a front face.

At step S610, a background manager may determine a disparity threshold at which an interclass variance between a first region including the face and a second region including no face is maximized based on the disparity values of pixels included in the image. The background manager may determine the first region so that the maximum disparity value of pixels included in the first region is less than or equal to the disparity threshold. In the first region, the face that is the target object may be included. The background manager may determine the second region including pixels so that the minimum disparity value of pixels included in the second region is greater than the disparity threshold.

At step S620, the background manager may remove the second region from the image based on the disparity threshold. The background manager may unify the pixel values of pixels included in the second region to a preset pixel value. The background manager may output an intermediate image including only the first region in response to an externally received command.

The background manager may generate the intermediate image in which the second region is removed from the image based on the disparity threshold. The background manager may cancel noise included in the intermediate image by applying a median filter to the intermediate image.

At step S630, a target object manager may count the number of first pixels included in the first region in a preset direction at a plurality of positions. The target object manager may determine a neck position corresponding to the face in the intermediate image based on the count values.

At step S640, the target object manager may set a region of interest including the face that is the target object based on the neck position. The target object manager may detect the face corresponding to a preset shape in the set region of interest.

Figure 7:
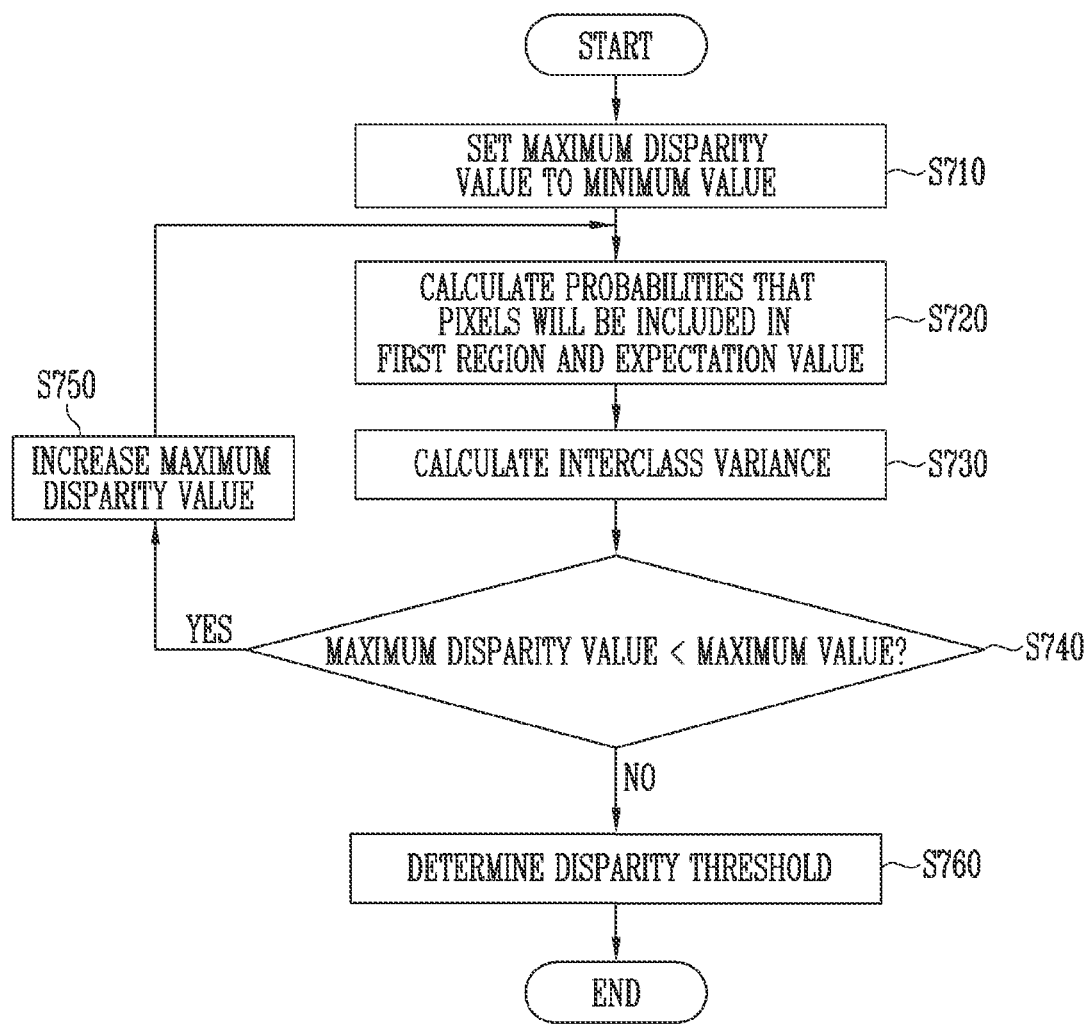
FIG. 7 is a flowchart illustrating steps of a method of determining a disparity threshold according to an embodiment of the present disclosure.

FIG. 7 is a flowchart illustrating a method of determining a disparity threshold according to an embodiment of the present disclosure. The steps of the method depicted in FIG. 7, i.e., setting values, S710, calculating probabilities, S720, calculating interclass variance, S730 . . . determining disparity thresholds, S760, are accomplished (effectuated) by program instructions executed by a processor.

Referring to FIG. 7, a background manager may determine the disparity threshold while changing the maximum disparity value of first pixels. The background manager may adaptively determine the disparity threshold at which an interclass variance between a first region including a face that is a target object and a second region including no face that is the target object is maximized.

At step S710, the background manager may set the maximum disparity value of the first pixels to the minimum value of the disparity values of pixels included in the image.

At step S720, the background manager may calculate first probabilities that pixels will be included in the first region, and the disparity expectation value of the pixels included in the first region, based on the disparity values.

At step S730, the background manager may calculate an interclass variance corresponding to the minimum value based on the first probabilities and the disparity expectation value of the first probabilities.

At step S740, the background manager may compare the maximum disparity value of the first pixels with the maximum value of the disparity values of the pixels. The background manager may calculate interclass variances while increasing the maximum disparity value of the first pixels until the maximum disparity value of the first pixels becomes equal to or greater than the maximum value of the disparity values of the pixels at step S750.

At step S750, the background manager may calculate the interclass variances in accordance with the maximum disparity value of the first pixels increasing within a range from the minimum value to the maximum value of the disparity values. An increment in the maximum disparity value of the first pixels may be uniform.

At step S760, the background manager may determine the maximum disparity value of the first pixels at which the interclass variances are maximized to be the disparity threshold based on the interclass variances. The background manager may improve the separation of the first region and the second region by adaptively determining the disparity threshold depending on the image.

In an embodiment of the present disclosure, the background manager may calculate the interclass variances in accordance with the maximum disparity value of the first pixels decreasing within a range from the maximum value to the minimum value of the disparity values. The background manager may set the disparity threshold based on the calculated interclass variances.

Figure 8:
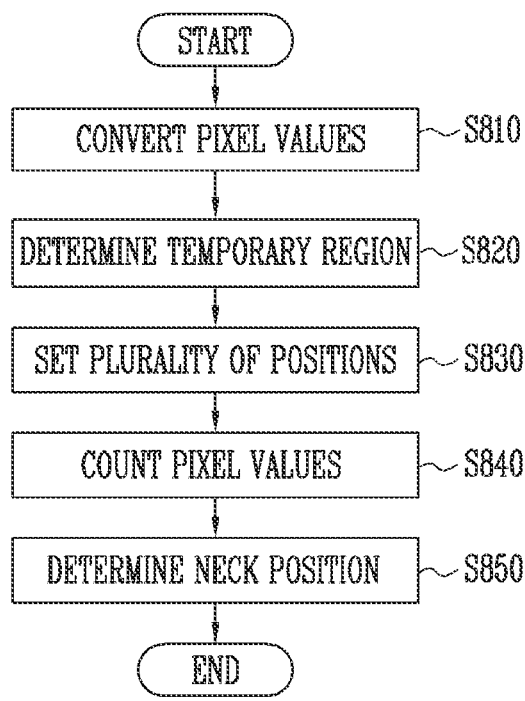
FIG. 8 is a flowchart illustrating steps of a method of determining a neck position according to an embodiment of the present disclosure.

FIG. 8 is a flowchart illustrating steps of a method of determining a neck position according to an embodiment of the present disclosure. The steps of the method depicted in FIG. 8, i.e., converting pixel values S810, determining image regions, S820 . . . determining neck positions, S850, are accomplished (effectuated) by program instructions executed by a processor.

Referring to FIG. 8, a target object manager may count the number of pixels included in a first region. The target object may determine the position of a neck corresponding to the thinnest portion in an image of an upper body based on the count value.

At step S810, the target object manager may convert the pixel values of pixels included in the first region of an intermediate image, in which a second region is removed from the image, into 1. The target object manager may convert the pixel values of pixels included in the first region, among the pixels, into 1, and may convert the pixel values of the remaining pixels into 0. In an embodiment of the present disclosure, when the pixel values included in the first region of the intermediate image are already converted into 1, step S810 may be skipped.

At step S820, the target object manager may generate two equal regions, obtained by dividing the image into the two equal regions in a preset direction. The target object manager may determine a region having a larger portion of the first region between the two equal regions to be a temporary region. In an embodiment of the present disclosure, the target object manager may set the temporary region including a partial face, the neck, and shoulders in a lower portion of the image.

At step S830, the target object manager may set a plurality of positions included in the boundary of the temporary region that is set based on the position of the first region in the image.

At step S840, the target object manager may count pixel values in the preset direction at the plurality of positions, respectively. The target object manager may count the number of pixels included in the first region by summing the pixel values in the preset direction.

At step S850, the target object manager may determine a position at which the sum of the converted pixel values is minimized, among the plurality of positions, to be the position of the neck. Because the neck position corresponds to a portion beneath the face, the probability that the face will be detected in a portion above the neck position may be increased once the neck position is determined.

Figure 9:
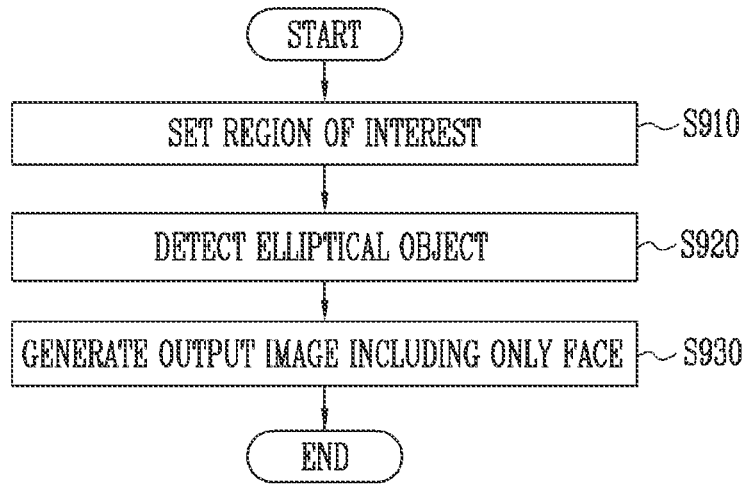
FIG. 9 is a flowchart illustrating steps of a method of generating an output image including only a face according to an embodiment of the present disclosure.

FIG. 9 is a flowchart illustrating steps of a method of generating an output image including only a face according to an embodiment of the present disclosure. The steps of the method depicted in FIG. 9, i.e., setting regions of interest, S910, detecting an ellipse, S920, generating output image data S930, are accomplished (effectuated) by program instructions executed by a processor.

Referring to FIG. 9, a target object manager may detect a face included in an image based on image data. Because a face detection operation is performed only on a region having a high probability that the face will be detected rather than on the entire image, the cost required for face detection may be reduced.

At step S910, the target object manager may set a region of interest in a direction vertical to a preset direction in a first region based on a neck position that is a reference for the face. The target object manager may set the region of interest in a direction above the neck position. The target object manager may set the region of interest in a direction in which the area of the first region is smaller based on the neck position.

At step S920, the target object manager may detect the position of a face corresponding to an elliptical object within the region of interest. The target object manager may generate an elliptical mask, and may detect the position of the face while moving the generated elliptical mask within the region of interest.

Figure 10:
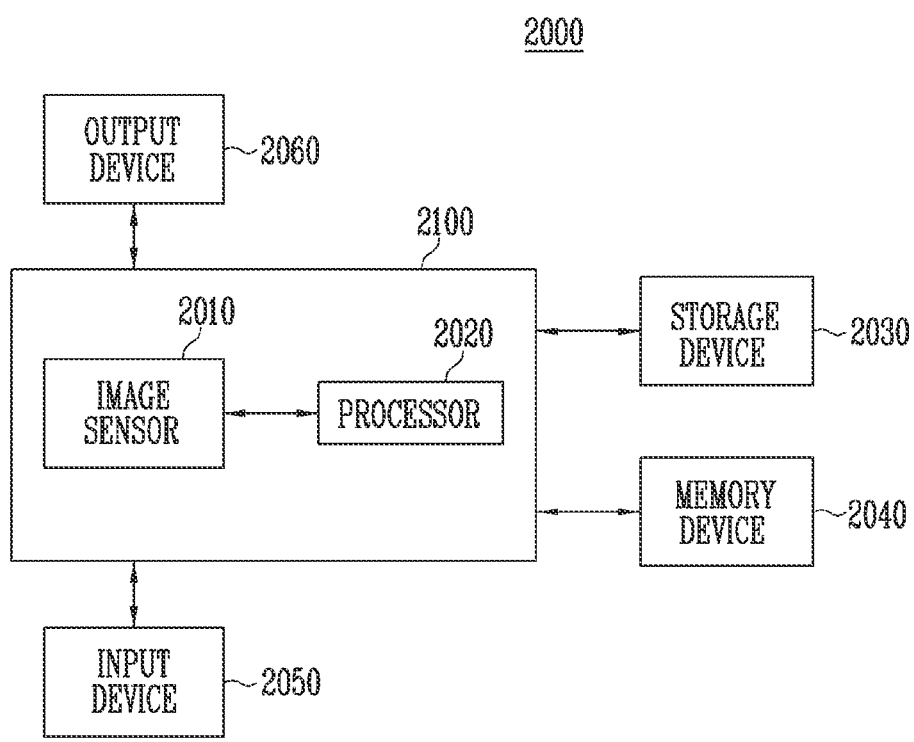
FIG. 10 is a block diagram illustrating an electronic device including an image processing device according to an embodiment of the present disclosure.

At step S930, the target object manager may generate an output image including only the face based on the detected face position and the image data. The target object manager may output a face image in response to an externally received command. FIG. 10 is a block diagram illustrating an electronic device including an image processing device 2100 according to an embodiment of the present disclosure. FIG. 1 depicts an image processing device 100.

Referring to FIG. 10, an electronic device 2000 may include an image sensor 2010, a processor 2020, a storage device 2030, a memory device 2040, an input device 2050, and an output device 2060. Although not illustrated in FIG. 10, the electronic device 2000 may further include ports which are capable of communicating with a video card, a sound card, a memory card, or a USB device, or communicate with other electronic devices.

The image sensor 2010 may generate image data corresponding to incident light. In an embodiment of the present disclosure, the image sensor 2010 may include a depth sensor. The image sensor 2010 may generate depth data including disparity information. The image sensor 2010 may transfer the depth data and the image data to the processor 2020. The output device 2060 may display the image data. The storage device 2030 may store the image data. The processor 2020 may control the operations of the image sensor 2010, the output device 2060, and the storage device 2030.

The processor 2020 may be an image processing device, or component thereof, which performs an operation of processing the image data received from the image sensor 2010 and outputs the processed image data. Here, processing may include electronic image stabilization (EIS), interpolation, tonal correction, image quality correction, size adjustment, etc.

The processor 2020 may be implemented as a chip independent of the image sensor 2010. For example, the processor 2020 may be implemented as a multi-chip package. In an embodiment of the present disclosure, the processor 2020 and the image sensor 2010 may be integrated into a single chip so that the processor 2020 is included as a part of the image sensor 2010.

The processor 2020 may execute program instructions, which control operation of the electronic device 2000. In accordance with an embodiment of the present disclosure, the processor 2020 may be a microprocessor, a central processing unit (CPU), or an application processor (AP). The processor 2020 may be coupled to the storage device 2030, the memory device 2040, the input device 2050, and the output device 2060 through an address bus, a control bus, and a data bus, and may then communicate with the devices.

In an embodiment of the present disclosure, by executing appropriate instructions, the processor 2020 may segment an image into a foreground region and a background region based on depth data including disparity values, and may determine a neck position related to a face object based on the number of pixels included in the foreground region. By executing other instructions, the processor 2020 may detect a face object corresponding to an elliptical shape within a region of interest that is set based on the neck position. The processor 2020 may determine a disparity threshold that is a criterion based on which the foreground region and the background region are differentiated from each other based on a probability distribution corresponding to the disparity values of the pixels. The processor 2020 may determine the disparity threshold so that an interclass variance is maximized, thus improving the separation of the foreground region and the background region. Stated another way, by executing appropriate instructions, the processor 2020 may efficiently detect a target object included in an image obtained by the image sensor 2010, (e.g., a front face included in an upper body) at low cost.

The storage device 2030 may include all types of nonvolatile memory devices including a flash memory device, a solid state drive (SSD), a hard disk drive (HDD), and a CD-ROM.

The memory device 2040 may store data required for the operation of the electronic device 2000. For example, the memory device 2040 may include a volatile memory device such as a dynamic random access memory (DRAM) or a static random access memory (SRAM), and a nonvolatile memory device such as an erasable programmable read-only memory (EPROM), an electrically erasable programmable read-only memory (EEPROM), or a flash memory device. Instructions for the processor 2020, which when executed may cause the processor 2020 to control the image sensor 2010 and the output device 2060 as described above, may be stored in the memory device 2040.

The input device 2050 may include an input means such as a keyboard, a keypad, or a mouse, and the output device 2060 may include an output means such as a printer device or a display.

The image sensor 2010 may be implemented as various types of packages. For example, at least some components of the image sensor 2010 may be implemented using any of packages such as package on package (POP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

The electronic device 2000 may be construed as including any device using or having an image sensor 2010 examples of which include but are not limited to, a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

For claim construction purposes, "background manager" and "target object manager" should be construed to include computer program instructions (software), which can cause a processor to implement (effectuate) the methods (steps) described above and those methods (steps) specifically depicted in FIGS. 6-9. "Background manager" and "target object manager" should also be construed as including a processor provided with program instructions that cause a processor to effectuate control over associated (peripheral) devices, such as those depicted in FIG. 10, and thereby cause those devices to perform the methods (steps) described above and those specifically depicted in FIGS. 6-9.

In accordance with the present disclosure, a threshold for segmenting an image into a foreground region including a target object and a background region including no target object may be adaptively determined based on disparity values. Further, in accordance with the present disclosure, there may be provided an image processing device, which performs an efficient face detection operation at low cost in a situation (e.g., taking a selfie) corresponding to a preset condition.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure.

What is claimed is:

1. An image processing device comprising:
a background manager configured to:
   determine a foreground region of an image including a target object and;
   determine a background region of the image that is without the target object in the image based on image data, the image data including pixel values of pixels included in the image and depth map data, the depth map data comprising disparity values of the pixels; and
a target object manager configured to determine a reference position of the target object based on count values obtained by counting foreground pixels included in the foreground region in a preset direction at a plurality of positions, and to detect the target object corresponding to a preset shape within a region of interest that is set based on the reference position.

2. The image processing device according to claim 1, wherein:
the background manager is configured to determine a disparity threshold at which an interclass variance between the foreground region and the background region is maximized based on the disparity values, and
a maximum disparity value of the foreground pixels is the disparity threshold.

3. The image processing device according to claim 2, wherein the background manager is configured to calculate probabilities that the pixels will be included in the foreground region, and an expectation value that is an average of the probabilities, based on the disparity values and to calculate the interclass variance based on the probabilities and the expectation value.

4. The image processing device according to claim 2, wherein the background manager is configured to determine the disparity threshold based on interclass variances calculated while increasing the maximum disparity value of the foreground pixels within a range from a minimum value to a maximum value of the disparity values.

5. The image processing device according to claim 2, wherein the background manager is configured to segment the image into the foreground region and the background region based on the disparity threshold.

6. The image processing device according to claim 5, wherein the background manager is configured to cancel noise included in the foreground region and the background region.

7. The image processing device according to claim 1, wherein:
the target object manager is configured to set a temporary region based on a position of the foreground region in the image, and
the plurality of positions are included in a boundary of the temporary region.

8. The image processing device according to claim 7, wherein the target object manager is configured to determine a position at which a count value is minimized, among the plurality of positions, to be the reference position.

9. The image processing device according to claim 7, wherein the target object manager is configured to generate equal regions, obtained by dividing the image into the equal regions in the preset direction, and to determine a region having a larger portion of the foreground region, among the equal regions, to be the temporary region.

10. The image processing device according to claim 7, wherein the target object manager is configured to convert pixel values of pixels included in the foreground region, among pixels included in the temporary region, into 1 and to convert pixel values of remaining pixels into 0.

11. The image processing device according to claim 10, wherein the target object manager is configured to sum pixel values of the pixels included in the temporary region in the preset direction at the plurality of positions.

12. The image processing device according to claim 8, wherein the target object manager is configured to set the region of interest in a direction vertical to the preset direction in the foreground region based on the reference position.

13. The image processing device according to claim 12, wherein the target object manager is configured to determine an elliptical object within the region of interest to be the target object.

14. A face detection method using an image processing device, comprising:
determining a disparity threshold at which an interclass variance between a first region including a face and a second region including no face in an image is maximized based on disparity values of pixels included in the image;
removing the second region from the image based on the disparity threshold;
determining a neck position corresponding to the face based on count values obtained by counting first pixels included in the first region in a preset direction at a plurality of positions; and
detecting the face corresponding to a preset shape within a region of interest that is set based on the neck position.

15. The face detection method according to claim 14, wherein determining the disparity threshold comprises:
calculating probabilities that the pixels will be included in the first region and an expectation value that is an average of the probabilities, based on the disparity values; and
calculating the interclass variance based on the probabilities and the expectation value.

16. The face detection method according to claim 14, wherein determining the disparity threshold comprises:
calculating interclass variances in accordance with a maximum disparity value of the first pixels increasing within a range from a minimum value to a maximum value of the disparity values; and
determining a maximum disparity value of the first pixels appearing when the interclass variances are maximized to be the disparity threshold based on the interclass variances.

17. The face detection method according to claim 14, wherein removing the second region comprises:
generating an intermediate image in which the second region is removed from the image based on the disparity threshold; and
applying a median filter to the intermediate image.

18. The face detection method according to claim 17, wherein determining the neck position comprises:
converting pixel values of pixels included in the first region, among the pixels, into 1 and converting pixel values of remaining pixels into 0 based on the intermediate image;
setting the plurality of positions included in a boundary of a temporary region that is set based on a position of the first region in the image;
respectively summing the converted pixel values in the preset direction at the plurality of positions; and
determining a position at which a sum of the converted pixel values is minimized, among the plurality of positions, to be the neck position.

19. The face detection method according to claim 18, wherein setting the plurality of positions comprises:
generating equal regions, obtained by dividing the image into the equal regions in the preset direction; and
determining a region including a larger portion of the first region, among the equal regions, to be the temporary region.

20. The face detection method according to claim 14, wherein determining the face comprises:
setting the region of interest in a direction vertical to the preset direction in the first region based on the neck position;
detecting a position of a face corresponding an elliptical object in the region of interest; and
generating an output image including only the face in the image based on the position of the face.

21. A face detection method using an image processing device, comprising:
determining a disparity threshold at which an interclass variance between a first region including a face and a second region including no face is maximized in an image including pixels, based on a probability distribution corresponding to disparity values of the pixels;
segmenting the image into the first region and the second region based on the disparity threshold;
setting a plurality of positions within a region including a larger portion of the first region among equal regions, obtained by dividing the image into the equal regions in a preset direction;
counting numbers of first pixels included in the first region in the preset direction at the plurality of positions;
determining a position at which a smallest number of first pixels are counted, among the plurality of positions, to be a neck position corresponding to the face; and
detecting the face corresponding to a preset shape in a region of interest that is set based on the neck position.

* * * * *